United States Patent Office 3,769,256
Patented Oct. 30, 1973

3,769,256
RUBBERY COMPOSITIONS
Toshio Yoshimoto, 2134-3 Ogawa-Higashi-cho; Takaaki Imamura, 2800-1 Ogawa-Higashi-cho; and Kazuo Tanaka, 864-1, 2-chome, Onda-machi, all of Tokyo, Japan
No Drawing. Continuation of abandoned application Ser. No. 743,923, July 11, 1968. This application Apr. 18, 1972, Ser. No. 245,198
Int. Cl. C08c 11/10; C08d 5/00
U.S. Cl. 260—41.5 A          1 Claim

ABSTRACT OF THE DISCLOSURE

Rubbery composition is prepared by mixing 100 parts by weight of a hydrogenated hydrocarbon copolymer having a glass transition temperature of above $-100°$ C. and having polymeric monomer units which consist of (1) 5 to 60% by weight of vinyl-aromatic hydrocarbon units, (2) not less than 10% by weight of hydrogenated conjugated diolefin units and (3) unhydrogenated conjugated diolefin units, wherein said vinyl-aromatic hydrocarbon units are essentially randomly distributed in the polymeric monomer units, and 5 to 200 parts by weight of an inorganic reinforcing filler having a number average particle diameter of less than 500 m$\mu$.

---

This is a continuation of application Ser. No. 743,923, filed July 11, 1968, now abandoned.

This invention relates to a new class of rubbery compositions comprising a hydrogenated hydrocarbon copolymer reinforced with a filler.

It is well known that rubber articles such as tires, tubes, belts, hoses, rubber shoes, rubber coating clothes, rubber sheets and other rubber goods are manufactured through a vulcanization process. It is also well known that troublesome vulcanizing equipment and related facilities are needed to effect vulcanization, which are expensive and consuming a large amount of steams and electric powers on operation. It is therefore greatly advantageous for manufacturers of rubber articles to diminish to zero the costs of installation and operation accompanying with the vulcanization process.

Despite the vulcanization process has the above mentioned economical and technical disadvantages, rubber articles from commonly used rubbers such as natural rubber, styrene-butadiene rubber and polybutadiene rubber must be manufactured through the vulcanization process, because they cannot have the strength enough to put them to practical uses without being vulcanized. Natural rubber, of which tensile strength in the unvulcanized state is the largest among commonly used rubbers mentioned above, has the tensile strength of 20 kg./cm.$^2$ at the best before vulcanization, but has the tensile strength of more than 100 kg./cm.$^2$ enough to practical uses after vulcanization. As styrene-butadiene random copolymers and polybutadienes are poor in the cohesion in unvulcanized state, we can hardly obtain their unvulcanized rubbery compositions of practical use even if they are reinforced with active fillers.

It is an object of the present invention, therefore, to provide a new class of rubbery compositions, especially a new rubbery composition having a high tensile strength without vulcanization. Another object of the present invention is to provide a new rubbery composition suitable for manufacturing rubber articles. A further object of the present invention is to provide a new advantageous method for manufacturing rubber articles. Other and further objects will become apparent during the following detailed description of the invention.

We have discovered that a new class of rubbery compositions comprising a hydrogenated hydrocarbon copolymer reinforced with a special filler have greatly large tensile strength in unvulcanized state. Namely the unvulcanized tensile strength of styrene-butadiene random copolymer which does not reach the range of practical use, increases remarkably by hydrogenating a proper amount of butadiene units of the copolymer without degradation. And also, the tensile strength of these hydrogenated hydrocarbon copolymers can reach surprisingly to about 450 kg./cm.$^2$ in unvulcanized state by incorporating into them a proper amount of a special reinforcing filler. These facts are surprising because the rubbery compositions from commonly used hydrocarbon rubbers could not give the strength of practical use before vulcanization through the conventional rubber technology, even if they were reinforced with active fillers.

The present invention is carried out on the ground of the above stated fact and provide a rubbery composition comprising from 5 to 200 parts by weight of an inorganic filler having number average particle diameter of smaller than 500 m$\mu$ and 100 parts by weight of a hydrogenated hydrocarbon copolymer having polymeric monomer units which consist of:

(1) vinyl aromatic hydrocarbon units of from 5 to 60 percent by weight,
(2) hydrogenated conjugated diolefin units of not less than 10 percent by weight and
(3) conjugated diolefin units of less than 85% by weight, wherein the vinyl aromatic hydrocarbon units are essentially randomly distributed in the polymeric monomer units, and the hydrogenated hydrocarbon polymer has the glass transition temperature of above 100° C.

The amount of the inorganic fillers incorporated in the rubbery compositions can vary within a broad range in the present invention. However, rubbery compositions which contain less than 5 parts and more than 200 parts by weight of the fillers per 100 parts by weight of the hydrogenated hydrocarbon copolymers show undesired properties owing to decrease of reinforcement. The inorganic fillers having number average particle diameter of larger than 500 m$\mu$ show unsufficient reinforcement when used in the present invention.

The amounts of vinyl aromatic hydrocarbon unit and hydrogenated conjugated diolefin unit can vary widely in polymeric monomer units of the hydrogenated hydrocarbon copolymer in the present invention. However, the hydrogenated hydrocarbon copolymers which contain less than 5 weight percent or more than 60 weight percent of vinyl aromatic hydrocarbon units have unsatisfactory rubbery properties when they are incorporated with a filler. The hydrogenated hydrocarbon copolymers which contain less than 10 percent by weight of hydrogenated conjugated diolefin units show no satisfactory reinforcement.

In order to obtain the rubbery compositions having the sufficiently high tensile strength, it is preferable to mixing from 5 to 100 parts by weight of an inorganic reinforcing filler having number average particle diameter of smaller than 200 m$\mu$ with 100 parts by weight of a hydrogenated hydrocarbon copolymer having polymeric monomer units which consist of (1) vinyl aromatic hydrocarbon units of from 5 to 30 percent by weight,
(2) hydrogenated conjugated diolefin units of more than the content of (3) conjugated diolefin units by weight and
(3) conjugated diolefin units of residual.

Examples of said vinyl aromatic hydrocarbons include styrene and α-methyl styrene. In the case of styrene the vinyl aromatic hydrocarbon units are expressed by

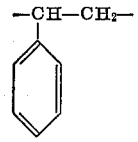

and in the case of α-methyl styrene the vinyl aromatic hydrocarbon units are expressed by

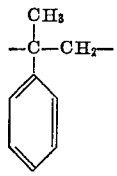

Examples of said conjugated diolefins include 1,3-butadiene and isoprene. Polymeric monomer units are illustrated as the following. In the case of 1,3-butadiene, the conjugated diolefin units are expressed by

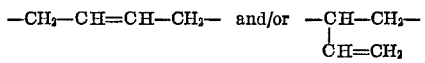

and the hydrogenated conjugated diolefin units are expressed by

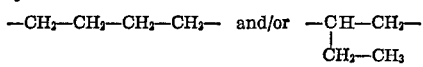

In the case of isoprene, the conjugated diolefin units are expressed by

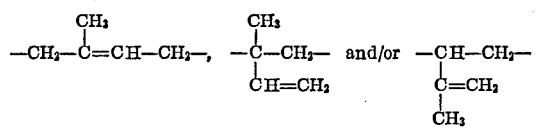

and the hydrogenated conjugated diolefin units are expressed by

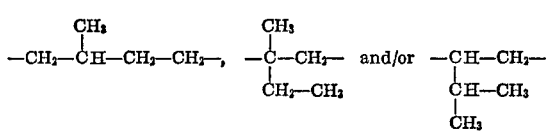

The hydrogenated copolymer utilized in the present invention may be easily prepared by hydrogenating a suitable amount of diolefin units of the essentially random copolymer consisting of conjugated diolefin units and from 5 to 60 percent by weight of vinyl aromatic hydrocarbon units per total units. The hydrogenated copolymers utilized in the present invention have the glass transition temperature of about —100° C. As the essentially random copolymer to be hydrogenated, the copolymers of which glass transition temperature becomes higher as the content of the hydrogenated diolefin units increases, are preferably used. This is based upon our discovery that the glass transition temperature of a copolymer containing a suitable amount of vinyl aromatic hydrocarbon units becomes higher by hydrogenating its conjugated diolefin units and from such hydrogenated copolymer can be obtained the rubbery composition having excellent properties characterizing the present invention. Further, the essentially random copolymer in which a major part of diolefin units is combined by 1,4-addition, is preferably used. Examples of the essentially random copolymer include styrene-butadiene random copolymer, styrene-isoprene random copolymer, α-methylstyrene-butadiene random copolymer, α-methylstyrene-isoprene random copolymer and the like. These copolymers can be easily prepared by solution-polymerization through the use of a catalyst based on an alkali metal compound and a Ziegler-type catalyst and also prepared by emulsion polymerization through the use of a radical type initiator, and the most of them are now commercially available. The copolymers prepared by solution-polymerization are preferably used because of their high 1,4-addition content.

The hydrogenation of the essentially random copolymer is carried out in a solution form by the use of a hydrogenation catalyst. The catalysts which can carry out the selective hydrogenation of diolefin units may be preferably used. When the styrenic units and the diolefinic units of the copolymer are hydrogenated nonselectively, the obtained polymer often becomes resin like and is not suitable for manufacturing rubber articles. An ordinary reduced metal catalyst such as Raney nickel and nickel kieselguhr may be used, but it is necessary to use a large amount of catalysts, a high reaction temperature of from 150 to 200° C. or higher and a high hydrogen pressure in order to hydrogenate the copolymers efficiently, because a solution of the copolymer is highly viscous compared with that of low molecular weight olefins. These high temperature hydrogenation conditions often cause the degradation of the copolymers and the high molecular weight hydrogenated copolymers are not obtained. Further, these catalysts are easily poisoned by impurities which are difficult to be removed from and it is very difficult to remove such catalyst residue from the hydrogenated copolymers after hydrogenation. The catalyst residue left in the hydrogenated copolymers tends to deteriorate various properties of the composition or the cured composition containing them.

One of the suitable catalyst for preparing the hydrogenated copolymer employed in the present invention is the catalyst obtained by mixing an organic compound of the metal selected from the group consisting of nickel, cobalt and iron with an organometallic compound of the metal selected from the group consisting of Groups 1, 2 and 3 of the Periodic Table. This catalyst is soluble in the solution of the copolymer to be hydrogenated, and can carry out the selective hydrogen of conjugated diolefin units of the copolymer in a viscous solution form under a mild condition such as near room temperature and an atmospheric pressure of hydrogen. The copolymer of high Mooney viscosity even more than 40 can be easily hydrogenated under such mild condition wherein side reaction such as thermal degradation or gelation does not occur, and so the obtained polymer has no inferior properties resulted from the decrease of molecular weight or gel. Therefore, the hydrogenated copolymer prepared by the soluble catalyst has the improved properties and does not lose various good properties of the starting polymer. Such hydrogenated copolymer is suitable for attaining the object of the present invention.

Among the organic compounds of nickel, cobalt or iron, one of preferable compounds is a metal carboxylate. The metal carboxylates include nickel naphthenate, cobalt naphthenate, iron naphthenate, nickel octanoate, cobalt octanoate and the like. Other preferable compound is a metal chelate compound. As the chelating groups β-diketones, β-hydroxycarbonyl compound, 8-hydroxyquinoline and the like may be used. The metal chelate compounds include bis(acetylacetone)nickel, tris(acetylacetone)cobalt, bis(ethyl acetoacetate)nickel, bis(salicylaldehyde)nickel, bis(8-hydroxyquinoline)nickel, tris(8-hydroxyquinoline)cobalt, bis(3,5-diisopropylsalicylic acid) nickel and the like.

Among the organometallic compounds of the metal of Groups 1, 2 and 3 of the Periodic Table, a metal hydrocarbyl) compound of lithium, magnesium or aluminium is preferably used. Examples of such metal hydrocarbyl compounds include n-butyllithium, diethylmagnesium, triethylaluminium, triisobutylaluminium, triamylaluminium, diethylisobutylaluminium and the like. In addition to the organometallic compound, the metal hydrides such as lithium aluminum hydride and sodium borohydride may be used.

Further, besides above mentioned two components catalyst, a three components soluble catalyst consisting of above mentioned two catalytic components and olefinically or acetylenically unsaturated hydrocarbon is also preferably used. The soluble catalyst consisting of above mentioned two or three catalytic components is easily removed from the hydrogenated copolymer by adding polar solvent such as acetone and alcohol to the reaction mixture containing the hydrogenated copolymer and precipitating the polymer. To make the removal of the catalyst residue more effective, it is preferable to contact the reaction mixture with polar solvent or water containing a small amount of acid. The catalysts used for preparing the hydrogenated copolymer used in the present invention are not limited by the above mentioned soluble catalyst. Other catalysts which can proceed the selective hydrogenation of diolefinic units of high molecular weight copolymers without degradation or gelation may be used.

The Mooney viscosity at 100° C. of the essentially random copolymer to be hydrogenated or the hydrogenated copolymer used in the rubbery composition of the present invention may be varied widely. However, the hydrogenation of a copolymer having Mooney viscosity of more than 40 can be easily effected by the use of the above mentioned soluble catalysts without degradation of polymeric main chains and from the hydrogenated copolymer having high Mooney viscosity can be obtained the rubbery composition with extremely high tensile strength suitable for attaining the object of the present invention. For this reason, the essentially random copolymer having Mooney viscosity of more than 40 is preferably used in the present invention.

Number average particle diameter of the inorganic reinforcing fillers in the present invention means the value obtained by taking an average between number average longer diameter and number average shorter diameter of the particle of fillers. In the present invention, the particle diameter of inorganic reinforcing fillers which are mixed effectively with the hydrogenated hydrocarbon copolymers, is smaller than 500 m$\mu$. More preferably, it is smaller than 200 m$\mu$. The examples of them are carbon blacks and other inorganic compounds such as oxide, carbonate, silicate, sulfate or hydroxide of magnesium, calcium, zinc, aluminium, silicone, barium or titanium, their mixtures, and fine mixtures containing the above stated inorganic compounds as main component. The concrete examples of them are channel black, gas furnace black, oil furnace black, thermal black, zinc oxide, alumina, silica, titania, basic magnesium carbonate, activated calcium carbonate, ultrafine magnesium silicate, aluminium silicate, calcium silicate, aluminium sulfate, barium sulfate, hard clay and so on. In order to obtain the high degree of reinforcement, carbon black and/or white carbon, a common name of silica and/or a salt of silicate, are preferably used. Further, carbon black and silica having smaller particle diameter than 50 m$\mu$ are more preferably used in order to obtain rubbery compositions having extremely higher tensile strength than that of the vulcanizates of commonly used rubbers such as natural rubber, styrene-butadiene rubber and polybutadiene rubber.

Any known methods can be used for mixing the above mentioned inorganic reinforcing fillers with the hydrogenated hydrocarbon copolymers. One of them is a conventional dry mixing, in which the copolymer and the filler are mixed on a mill-roll or in an internal mixer. Another of them is a wet mixing, in which the inorganic reinforcing filler is dispersed in the solution of a hydrogenated hydrocarbon copolymer after hydrogenation and coagulated by conventional methods.

A rubbery composition of the present invention can be mixed with a lot of oily matter. By using various combination of kinds or quantities of inorganic reinforcing fillers and oily matters, the present invention therefore can provide rubbery compositions having various degree of stiffness, hardness or flexibility according to each object of various uses without the lack of the tensile strength.

Further, when the rubbery compositions are prepared in the desirable combinations of the fillers and oily matters, almost fundamental properties of them are similar to that of the vulcanizate of commonly used rubbers such as natural rubber, styrene-butadiene rubber and polybutadiene rubber, and some properties are superior to that of the said vulcanizates.

The tensile strength of the rubbery compositions of the present invention is so high that the vulcanization is not necessarily required as mentioned above, while the compositions have furthermore desirable merit that they may be vulcanized too by well known methods such as sulfur cure or peroxide cure. When the rubbery composition of the present invention is vulcanized, it is preferable that at least one, preferably five percent by weight of non-hydrogenated diolefin units exist in the hydrogenated copolymer. Moreover, even when the compositions of the present invention are vulcanized, the tensile strength of them does not decrease and some properties, especially at high temperature, are able to be improved. Further, the high tensile strength in the unvulcanized state is maintained after vulcanization and therefore it is able to compound a great amount of oily matter as pointed out in the unvulcanized state. In this case, the tensile strength of the vulcanized rubbery composition is as high as that of vulcanizates of styrene-butadiene rubber or polybutadiene rubber. However, the vulcanization is not always required except special uses at high temperature, because vulcanization brings about the economical and technical disadvantage as pointed out previously.

Depending upon the uses of the rubbery compositions, we can mix not only above stated agents, namely inorganic reinforcing fillers, oily matters (softeners or plasticizer) and curing agents (vulcanizing agents, accelerator, activators, retarders) but also most kinds of compounding ingredients used commonly in rubber industry with the compositions. Examples of them are antioxidants, antiozonants, waxes, ultraviolet light absorbers, tackifiers, peptizers, blowing agents, blowing promoters, flame retardants, internal anti-static agents, coloring agents, modifiers, stiffeners, odorants, fungicides, termite repellents, rat repellents, inorganic fillers, organic fillers and organic reinforcing fillers.

The rubbery formed articles from the rubbery compositions of the present invention can be manufactured by the well known methods such as injection molding, blow molding, transfer molding, compression molding, extruding, calendering and so on. Other applications of the rubbery composition of the present invention are rubber cements having high strength and rubber paints having high elasticity, which are manufactured by dissolving them in proper solvents.

The invention is illustrated in the greater detail in the following examples which are not intended, however, to be unduly limitative of the invention.

EXAMPLE 1

The ten samples as described below were prepared.

(A) A solution-polymerized styrene-butadiene random copolymer (styrene/butadiene:18/82, ML–4:45) prepared by the use of lithium catalyst.

(B) A rubbery composition prepared by mixing 25 phr. (parts by weight per hundred parts by weight of rubber) of hydrous silica (number average particle diameter: 16 m$\mu$, content of silica: 82%) with (A) on a mill roll with 3″ diameter.

(C) A hydrogenated styrene-butadiene random copolymer in which the content of styrene units was 18 wt. percent, butadiene units was 3 wt. percent and hydrogenated butadiene units was 79 wt. percent, which was determined by the degree of unsaturation according to the Kemp-Wijs method and infrared spectrum analysis (glass transition temperature: –22° C.). The hydrogenated copolymer was prepared by hydrogenating (A) in a 6 weight percent toluene solution at 25° for 5½ hours under a hydrogen pressure of 10 kg./cm.$^2$. The catalyst used was prepared by mixing 4 mmol of nickel naphthenate with 11 mmol of triethylaluminium per a liter of the copolymer solution to be hydrogenated. After hydrogenation, the hydrogenated copolymer was recovered by adding methanol containing a small amount of hydrochloric acid to the copolymer solution and mixing a large amount of methanol with the copolymer solution to precipitate the hydrogenated copolymer.

(D) A rubbery composition prepared by mixing 25 phr. of hydrous silica (number average particle diameter: 16 m$\mu$, content of silica: 86%) with (C) on a mill roll with 3″ diameter.

(E) A emulsion-polymerized styrene-butadiene random copolymer (styrene/butadiene: 23/77, ML–4:52).

(F) A rubbery composition prepared by mixing 100 phr. of (E) with the following ingredients.

|  | Phr. |
|---|---|
| Carbon black (number average particle diameter: 20 m$\mu$) | 45 |
| Zinc oxide | 5 |
| Stearic acid | 2 |
| Aromatic oil | 10 |
| Sulfur | 2 |
| N-oxydiethylene-2-benzothiazol sulfenamide | 1 |
| N-phenyl-$\beta$-naphthylamine | 1 |

(G) A vulcanized rubbery composition prepared by vulcanizing (F) at 145° C. for 60 minutes to form a sheet of 2 mm. thickness by a press. (This vulcanized rubber has typical tensile strength as vulcanized styrene-butadiene copolymer.)

(H) A natural rubber (RSS #3).

(I) A rubbery composition prepared by mixing 100 phr. of (H) with the following ingredients.

|  | Phr. |
|---|---|
| Carbon black (number average particle diameter: 20 m$\mu$) | 45 |
| Zinc oxide | 5 |
| Stearic acid | 3 |
| Aromatic oil | 5 |
| Sulfur | 2 |
| N-oxydiethylene-2-benzothiazol sulfenamide | 1 |
| N-phenyl-$\beta$-naphthylamine | 1 |

(J) A vulcanized rubbery composition prepared by vulcanizing (I) at 145° C. for 30 minutes to form a sheet of 2 mm. thickness by a press. (This vulcanized rubber has typical tensile strength as vulcanized natural rubber).

(A), (B), (C), (D), (E), (F), (H) and (I) were pressed to a sheet of 2 mm. thickness at 120° for 2 minutes. The tensile strength of the test pieces taken from the obtained sheets was measured according to the method of JIS–K–6301. Results are shown in the following Table 1.

TABLE 1

| Sample: | Tensile strength (kg./cm.$^2$) |
|---|---|
| A | 2 |
| B | 2 |
| C | 253 |
| D | 421 |
| E | 2 |
| F | 3 |
| G | 256 |
| H | 7 |
| I | 5 |
| J | 308 |

These results show that the tensile strength in the unvulcanized state of the hydrogenated styrene-butadiene random copolymer used in the present invention is extremely higher than that of the original non-hydrogenated styrene-butadiene random copolymer, and furthermore without vulcanization the tensile strength of the hydrogenated copolymer increases higher than that of a vulcanized styrene-butadiene random copolymer or a natural rubber by mixing a suitable amount of inorganic reinforcing fillers such as hydrous silica with the hydrogenated copolymer. This fact is surprising on account of the fact that the tensile strength of a widely used styrene-butadiene random copolymer which increases scarcely by mixing inorganic reinforcing fillers such as silica and carbon black with the copolymer, if the copolymer is not vulcanized. The present invention is namely beyond the prior art (the reinforcing properties of fillers can never be obtained without vulcanization) and makes it possible to produce rubber articles without vulcanization of which tensile strength is higher than that of the vulcanized rubber.

EXAMPLE 2

Solution-polymerized or emulsion-polymerized styrene-butadiene random copolymers were hydrogenated and characterized in the same manner as shown in Example 1(C). The obtained hydrogenated copolymers are shown in the following Table 2.

TABLE 2

|  | (A) | (B) | (C) | (D) | (E) |
|---|---|---|---|---|---|
| Content of each unit (wt. percent): |  |  |  |  |  |
| Styrene units | 18 | 18 | 23 | 23 | 50 |
| Butadiene units | 30 | 3 | 33 | 11 | 2 |
| Hydrogenated butadiene units | 52 | 79 | 44 | 66 | 48 |
| Glass transition temperature (° C.) | −38 | −22 | −53 | −38 | −27 |

Each hydrogenated copolymer was mixed with 25 phr. of hydrous silica (number average particle diameter: 16 m$\mu$, content of silica: 86%) on a mill roll and the obtained composition was pressed to a sheet of 2 mm. thickness by press at 120° C. for 2 minutes. The tensile strength of the test pieces taken from the sheet was measured in the same manner shown in Example 1.

Results are shown in the following Table 3.

TABLE 3

| Sample | (A) | | (B) | | (C) | | (D) | | (E) | |
|---|---|---|---|---|---|---|---|---|---|---|
| Hydrous silica | No | Yes | No | Yes | No | Yes | No | Yes | No | Yes |
| Tensile strength (kg./cm.$^2$) | 96 | 106 | 253 | 421 | 63 | 71 | 72 | 150 | 9 | 30 |

These results show that the tensile strength of the hydrogenated copolymer used in the present invention increases by mixing a suitable filler with the copolymer in the wide range of the content of styrene units and butadiene units and moreover the tensile strength becomes higher as the content of hydrogenated butadiene units becomes richer.

EXAMPLE 3

The hydrogenated copolymers prepared in Example 1(C) were mixed with 25 phr. of various inorganic reinforcing fillers on a mill roll and the obtained rubbery compositions were pressed to sheets of 2 mm. thickness at 120° C. for 2 minutes. The tensile strength was measured in the same manner as shown in Example 1 and the diameter of the filler used was also measured by an electron microscope.

Results are shown in the following Table 4.

TABLE 4

|  | (A) Hydrous silica | (B) Carbon black (1) | (C) Calcium carbonate (1) | (D) Carbon black (2) | (E) Titanium oxide | (F) Zinc oxide | (G) Calcium carbonate (2) | (H) None |
|---|---|---|---|---|---|---|---|---|
| Number average particle diameter (mμ) | 16 | 21 | 41 | 150 | Shorter diameter, 135.. Longer diameter, 160.. | 195 423 | 455 | |
| Tensile strength (kg./cm.²) | 421 | 378 | 283 | 296 | 300 | 275 | 267 | 253 |

These results show that the inorganic filler of which number average diameter is below 500 mμ is excellent as the reinforcing filler and the degree of reinforcement becomes higher as the diameter of the filler becomes smaller.

EXAMPLE 4

The hydrogenated copolymers prepared in Example 1(C) were mixed with from 25 to 75 phr. of hydrous silica on a mill roll and the obtained rubbery compositions were pressed to sheets of 2 mm. thickness at 120° C. for 2 minutes. The tensile strength was measured in the same manner as shown in Example 1.

Results are shown in the following Table 5.

TABLE 5

|  | (A) | (B) | (C) | (D) |
|---|---|---|---|---|
| Hydrous silica (phr.) | 0 | 25 | 50 | 75 |
| Tensile strength (kg./cm.²) | 253 | 421 | 325 | 280 |

These results show that the reinforcing properties are obtained in the wide range of the content of the inorganic filler.

EXAMPLE 5

The hydrogenated copolymers prepared in Example 1(C) were mixed with hydrous silica and liquid paraffin on a mill roll and the obtained rubbery compositions were pressed to sheets of 2 mm. thickness at 120° C. for 2 minutes. The tensile strength was measured in the same manner as shown in Example 1. Further, the same measurement was carried out about the vulcanized styrene-butadiene random copolymer (SBR) of Example 1(G) and the vulcanized natural rubber of Example 1(J) to compare with the hydrogenated copolymer. Resilience was measured at 25° C. by using Dunlop tripsometer.

Results are shown in the following Table 6.

TABLE 6

|  | Hydrogenated copolymer | | | | | Vulcanized | |
|---|---|---|---|---|---|---|---|
|  | (A) | (B) | (C) | (D) | (E) | (F) SBR | (G) NR |
| Hydrous silica (phr.) | 0 | 25 | 25 | 25 | 50 | | |
| Liquid paraffin (phr.) | 0 | 0 | 25 | 50 | 25 | | |
| Elongation (percent) | 510 | 480 | 600 | 640 | 620 | 450 | 570 |
| 300% modulus (kg./cm.²) | 87 | 186 | 86 | 58 | 161 | 153 | 142 |
| Tensile strength (kg./cm.²) | 253 | 421 | 389 | 262 | 282 | 256 | 308 |
| Resilience (percent) | 66.5 | 57.6 | 61.8 | 57.6 | 54.3 | 51.8 | 55.8 |

These results show that the reinforcing properties are obtained which is reinforced highly by hydrous silica can be mixed with a large amount of oil and in such case can be obtained the unvulcanized rubbery composition of which tensile strength and resilience are as high as those of the vulcanized natural rubber and the vulcanized styrene-butadiene random copolymer. These results also show that from the hydrogenated copolymer can be obtained the rubbery composition having not only high tensile strength but also various properties similar to the vulcanized rubber which is widely used and further the hydrogenated copolymer reinforced by filter has excellent rubber elasticity.

EXAMPLE 6

In the same manner as shown in Example 1(C), a hydrogenated random copolymer consisting of 23 percent by weight of styrene units, 11 percent of butadiene units and 66 percent of hydrogenated butadiene units was prepared (glass transition temperature: −28° C.) and then compounded by the same recipe as used in Example 1(E) and vulcanized. Physical properties before and after vulcanization are shown in the following Table 7.

TABLE 7

|  | Before vulcanization | After vulcanization |
|---|---|---|
| Tensile strength (kg./cm.²) | 180 | 313 |
| Elongation (percent) | 860 | 440 |
| Resilience (percent): | | |
| At room temperature | 56.5 | 58.0 |
| At 100° C. | 21.5 | 66.5 |

These results show that not only the tensile strength does not decrease by vulcanization but also the property at high temperature is improved and also the rubbery composition of the present invention can be used not only in the unvulcanized state but also in the vulcanized state depending upon the use of the rubbery composition.

EXAMPLE 7

In the same manner as shown in Example 1(C), various hydrogenated copolymers were prepared from emulsion-polymerized styrene-butadiene random copolymers (ML–4:52), which are shown in the following Table 8.

TABLE 8

|  | (A) | (B) | (C) | (D) | (E) |
|---|---|---|---|---|---|
| Content of each units (wt. percent): | | | | | |
| Styrene units | 23 | 23 | 23 | 23 | 23 |
| Butadiene units | 60 | 43 | 37 | 31 | 11 |
| Hydrogenated butadiene units | 17 | 34 | 40 | 46 | 66 |
| Glass transition temperature (° C.) | −60 | −57 | −53 | −51 | −38 |

Each hydrogenated copolymer was compounded by the same recipe used in Example 1(F) and vulcanized at 145° C. for 60 minutes. Physical properties of the vulcanized rubber were measured in the same manner as shown in Example 5.

Results are shown in the following Table 9.

TABLE 9

|  | (A) | (B) | (C) | (D) | (E) |
|---|---|---|---|---|---|
| Tensile strength (kg./cm.²) | 268 | 241 | 264 | 289 | 313 |
| Elongation (percent) | 476 | 365 | 365 | 405 | 440 |
| Resilience (percent) | 55.5 | 59.0 | 61.0 | 60.5 | 58.0 |

These results show that the vulcanized rubbery composition having excellent properties can be obtained from various kinds of hydrogenated copolymers used in the present invention.

EXAMPLE 8

In the same manner as shown in Example 1(C), a hydrogenated copolymer (glass transition temperature: −42° C.) consisting of 23 percent by weight of styrene units, 16 percent of butadiene units and 61 percent of hydrogenated butadiene units was prepared. The compounding recipe is shown in the following Table 10.

TABLE 10

| | (A) | (B) |
|---|---|---|
| Hydrogenated copolymer | 100 | 100 |
| Carbon black (number average particle diameter: 20 mμ) | 100 | 150 |
| Aromatic oil | 100 | 30 |
| Spindle oil | | 70 |
| Zinc oxide | 5 | 5 |
| Stearic acid | 1 | 1 |
| Novolac-type alkylphenolformaldehyde resin | 5 | 5 |
| N-phenyl-β-naphthylamine | 1 | 1 |
| N-oxydiethylene-2-benzothiazole sulfenamide | 1 | 1 |
| Sulfur | 2 | 2 |

The obtained rubbery compositions, (A) and (B) were vulcanized at 150° C. for 45 minutes and physical properties were measured according to the method of JIS-K-6301. Results are shown in the following Table 11.

TABLE 11

| | (A) | (B) |
|---|---|---|
| Hardness (JIS) | 53 | 59 |
| Elongation (percent) | 620 | 400 |
| 300% modulus (kg./cm.²) | 68 | 141 |
| Tensile strength (kg./cm.²) | 202 | 178 |

These results show that the vulcanized rubbery composition containing a large amount of inorganic reinforcing fillers of the present invention has comparable properties as those of the usual vulcanized styrene-butadiene random copolymer and the usual vulcanized polybutadiene which are widely used.

What is claimed is:

1. An unvulcanized rubbery composition comprising
(a) 100 parts by weight of a hydrogenated solution-polymerized styrene-butadiene copolymer having a glass transition temperature of above −100° C. and consisting of
  (1) from 5 to 60 percent by weight of styrene units
  (2) less than 85 percent by weight of butadiene units, and
  (3) not less than 10 percent by weight of hydrogenated butadiene units,
  the total percentage of (1), (2), and (3) being 100 percent, wherein said styrene units are essentially randomly distributed in said copolymer and the styrene-butadiene copolymer prior to hydrogenation has a Mooney viscosity at 100° C. of more than 40 and
(b) from 5 to 200 parts by weight of a hydrous silica having an average particle diameter smaller than 200 mμ.

References Cited

UNITED STATES PATENTS 2,964,809  12/1958  Jones et al. _____ 260—94.7 H

OTHER REFERENCES

Morton: Introduction of Rubber Technology (Reinhold) (N.Y.) (1959), pp. 36–39 and 234–238.

Encyclopedia of Polymer Science and Technology, vol. 7, pp. 557–561 and 567 (Interscience) (N.Y.) (1967).

McPherson et al.: Engineering Uses of Rubber (Reinhold) (N.Y.) (1956), pp. 42–45.

ALLAN LIEBERMAN, Primary Examiner

H. H. FLETCHER, Assistant Examiner

U.S. Cl. X.R.

260—85.1, 94.7 H, 96 HY